(12) United States Patent
Hong

(10) Patent No.: US 10,993,191 B2
(45) Date of Patent: Apr. 27, 2021

(54) ELECTRONIC DEVICE HAVING ARRAY ANTENNA AND POWER BACKOFF METHOD FOR ANTENNA ARRAY

(71) Applicant: Samsung Electronics Co., Ltd., Gyeonggi-do (KR)

(72) Inventor: Seongbeom Hong, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/696,298

(22) Filed: Nov. 26, 2019

(65) Prior Publication Data
US 2020/0205087 A1 Jun. 25, 2020

(30) Foreign Application Priority Data
Dec. 20, 2018 (KR) .......................... 10-2018-0166123

(51) Int. Cl.
*H04W 52/28* (2009.01)
*H04W 16/28* (2009.01)
*H04W 52/30* (2009.01)

(52) U.S. Cl.
CPC ......... *H04W 52/283* (2013.01); *H04W 16/28* (2013.01); *H04W 52/30* (2013.01)

(58) Field of Classification Search
CPC ............. H04W 16/28; H04W 52/0274; H04W 52/283; H04W 52/30
See application file for complete search history.

(56) References Cited

U.S. PATENT DOCUMENTS

| 8,588,700 | B2 | 11/2013 | Schmidt et al. |
| 9,531,420 | B1 | 12/2016 | Prendergast et al. |
| 10,148,402 | B2 | 12/2018 | Lin et al. |
| 2009/0137235 | A1 | 5/2009 | Schmidt et al. |
| 2010/0279751 | A1 | 11/2010 | Pourseyed et al. |

(Continued)

FOREIGN PATENT DOCUMENTS

| KR | 10-1861270 B1 | 5/2018 |
| KR | 10-2018-0068282 A | 6/2018 |

(Continued)

OTHER PUBLICATIONS

European Search Report dated May 7, 2020 issued in counterpart appilcation No. 19212071.5-1220, 10 pages.

(Continued)

*Primary Examiner* — Keith Ferguson
(74) *Attorney, Agent, or Firm* — The Farrell Law Firm, P.C.

(57) ABSTRACT

An electronic device and a method of performing power backoff for an array antenna including a plurality of antenna elements are provided. The electronic device includes an array antenna including a plurality of antenna elements arranged to perform beamforming, a proximity detecting device configured to detect a proximity of an object, a memory, and a processor, wherein the memory is configured to store instructions that, when executed, cause the processor to communicate with an external electronic device through a first beam formed using the plurality of antenna elements and deactivate at least one of the plurality of antenna elements when the proximity of the object is detected by the proximity detecting device during communication with the external electronic device.

19 Claims, 14 Drawing Sheets

(56) References Cited

U.S. PATENT DOCUMENTS

| | | |
|---|---|---|
| 2011/0250928 A1* | 10/2011 | Schlub .................. H01Q 1/243 |
| | | 455/550.1 |
| 2013/0178167 A1 | 7/2013 | Lockerbie et al. |
| 2015/0200444 A1* | 7/2015 | Mercer .................. H01Q 1/24 |
| | | 343/702 |
| 2015/0372656 A1 | 12/2015 | Mow et al. |
| 2016/0365886 A1 | 12/2016 | Prendergast et al. |
| 2017/0005707 A1 | 1/2017 | Islam et al. |
| 2017/0077977 A1 | 3/2017 | Prendergast et al. |
| 2017/0270536 A1 | 9/2017 | Williams |
| 2018/0167883 A1 | 6/2018 | Guo et al. |
| 2018/0198204 A1 | 7/2018 | Kovacic |
| 2018/0198583 A1 | 7/2018 | Lin et al. |
| 2019/0267709 A1* | 8/2019 | Mow ...................... H01Q 9/045 |

FOREIGN PATENT DOCUMENTS

| | | |
|---|---|---|
| KR | 10-2018-0072402 A | 6/2018 |
| KR | 10-2018-0081466 A | 7/2018 |
| WO | WO 2018/142132 | 8/2018 |
| WO | WO 2018/204993 | 11/2018 |

OTHER PUBLICATIONS

International Search Report dated Mar. 23, 2020 issued in counterpart appilcation No. PCT/KR2019/016225, 12 pages.

* cited by examiner

400

| ACTIVE ANTENNA QUANTITY | GAIN | GAIN CHANGE AMOUNT |
|---|---|---|
| 4 | 12.04 dB | |
| 3 | 9.54 dB | 2.5 dB |
| 2 | 6.02 dB | 6.02 dB |

| # of Active Antennas | TOTAL GAIN | TRANSMIT POWER REDUCTION | TOTAL GAIN REDUCTION |
|---|---|---|---|
| 4 | 12 dB | 0 dB | |
| | 11 dB | 1 dB | 1 dB |
| 3 | 9.5 dB | 0 dB | 2.5 dB |
| | 8.5 dB | 1 dB | 3.5 dB |
| | 7.5 dB | 2 dB | 4.5 dB |
| 2 | 6 dB | 0 dB | 6 dB |

FIG.6

ELECTRONIC DEVICE HAVING ARRAY ANTENNA AND POWER BACKOFF METHOD FOR ANTENNA ARRAY

CROSS-REFERENCE TO RELATED APPLICATION(S)

This application is based on and claims priority under 35 U.S.C. § 119 to Korean Patent Application No. 10-2018-0166123, filed on Dec. 20, 2018, in the Korean Intellectual Property Office, the disclosure of which is incorporated by reference herein in its entirety.

BACKGROUND

1. Field

The present disclosure relates to an electronic device that communicates with an outside using an antenna and controls the antenna.

2. Description of Related Art

Electronic devices that transmit signals through antennas to communicate with external devices have been widely used. For example, electronic devices may transmit radio waves to a space by using a radiator.

Further, there is a need to meet certain regulatory conditions for wireless communications. For example, a specification for maximum permissible exposure (MPE) has been established by the Federal Communications Commission (FCC). In addition, power density (PD) may be used to represent an exposure intensity for a specific range of frequencies. The PD is defined as power per unit area. For example, the PD may generally be expressed in watts per square meter (W/m2), milliwatts per square centimeter (mW/cm2), or microwatts per square centimeter (μW/cm2). In addition, many countries regulate to meet the criteria for specific absorption rate (SAR), which is an indicator of an absorption rate of electromagnetic waves in a human body. That is, an electronic device that transmits a wireless communication signal must limit an extent to which a human body is exposed to a radio wave when the human body approaches the electronic device because radio waves occurring in a wireless communication state may adversely affect the human body.

Manufacturers of electronic devices perform power backoff in a way to uniformly reduce a transmit power level of a wireless communication module in a specific situation (e.g., where the electronic device is located close to a user's body).

In accordance with the development of wireless communication technology, it is necessary to transmit a signal through beamforming using an array antenna to use a wireless communication signal in a high frequency band. In a case of uniformly reducing a transmit power level, a function of an electronic device may deteriorate, so it is necessary to perform backoff more efficiently during a communication operation using an array antenna.

SUMMARY

An aspect of the present disclosure provides an electronic device capable of performing power backoff efficiently during an operation in which an array antenna performs communication.

Another aspect of the present disclosure provides a method of performing power backoff.

Another aspect of the present disclosure provides a method of setting a power backoff table.

In accordance with an aspect of the present disclosure, an electronic device is provided. The electronic device includes an array antenna including a plurality of antenna elements arranged to perform beamforming, a proximity detecting device configured to detect a proximity of an object, a memory, and a processor, wherein the memory is configured to store instructions that, when executed, cause the processor to communicate with an external electronic device through a first beam formed using the plurality of antenna elements, and deactivate at least one of the plurality of antenna elements when the proximity of the object is detected by the proximity detecting device during communication with the external electronic device.

In accordance with another aspect of the present disclosure, a method of performing power backoff for an array antenna including a plurality of antenna elements. The method includes forming a first beam using the plurality of antenna elements, communicating with an external electronic device through the first beam, detecting proximity of an object while communicating with the external electronic device, determining a number of active antenna elements among the plurality of antenna elements when the proximity of the object is detected, and deactivating at least one antenna element among the plurality of antenna elements based on the determined number of active antenna elements.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a table of a gain change amount of an array antenna with respect to a number of active antenna elements, according to an embodiment;

FIG. 6 is a table of a gain change amount of an array antenna for a number of active antenna elements and a transmit power reduction amount, according to an embodiment;

DETAILED DESCRIPTION

Hereinafter, various embodiments of the present disclosure may be described with reference to the accompanying drawings. Accordingly, those of ordinary skill in the art will recognize that modification, equivalent, and/or alternative on the various embodiments described herein may be variously made without departing from the scope and spirit of the present disclosure.

In the present disclosure, a backoff operation event may indicate an event that allows an electronic device to perform a backoff operation when the backoff operation event occurs. In addition, the backoff operation may indicate an operation of lowering a PD of a signal generated by an array antenna.

In addition, the phrase "deactivating a component" may indicate blocking power supplied to the component to cause a function performed by the component to stop.

Figure 1:
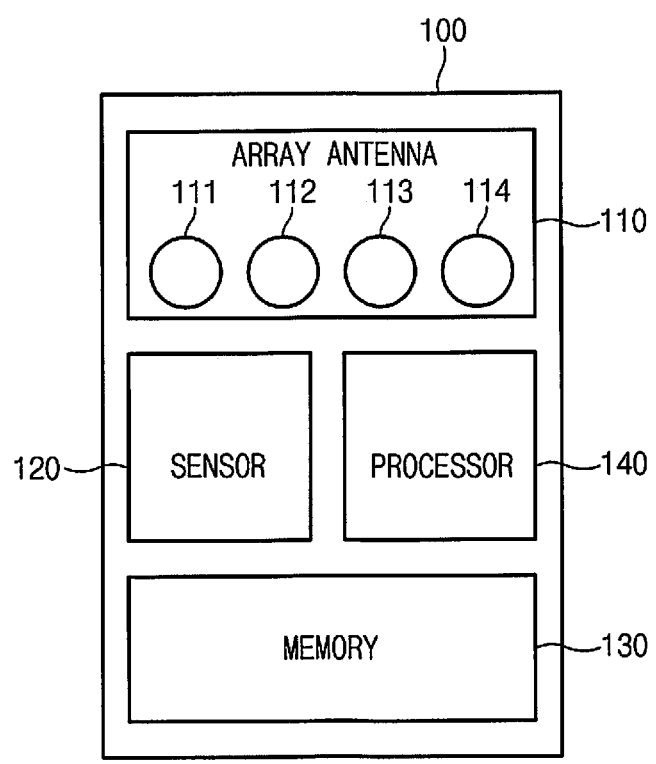
FIG. 1 is a block diagram of an electronic device, according to an embodiment.

FIG. 1 is a block diagram of an electronic device 100, according to an embodiment.

Referring to FIG. 1, the electronic device 100 may include an array antenna 110, a proximity detecting device 120 (e.g., a sensor), a memory 130, and a processor 140. The electronic device 100 may include more components than those shown in FIG. 1, or some components may be replaced with other components.

The array antenna 110 is for performing beamforming to form a beam to transmit a signal. In some cases, the array antenna 110 may be referred to as an antenna module. The array antenna 110 may include a plurality of antenna elements 111, 112, 113, and 114 to perform beamforming. That is, the electronic device 100 may form a beam (or a first beam) by adjusting the magnitudes and phases of signals respectively transmitted from the antenna elements 111, 112, 113, and 114 included in the array antenna 110.

The proximity detecting device 120 may determine whether an object such as a human body is located close to the electronic device 100 or is in contact with the electronic device 100. A type of the proximity detecting device 120 may be applied differently.

The proximity detecting device 120 may include a proximity sensor that detects an approaching object (e.g., a human body). For example, the proximity detecting device 120 may generate a signal when an object is within 10 mm of the proximity detecting device 120. Alternatively, the proximity detecting device 120 may include a distance sensor that detects a distance between the proximity detecting device 120 and an object. The proximity detecting device 120 may include a touch sensor for detecting whether a user holds the electronic device 100. The proximity detecting device 120 may include a communication circuit. The communication circuit may include, for example, a radio frequency integrated circuit (RFIC) and an antenna module. In this case, the antenna module may include the array antenna 110. The communication circuit may transmit a radio signal through at least one antenna element 111, 112, 113, or 114 included in the array antenna 110. In addition, the communication circuit may receive a reflected signal generated when a signal transmitted through at least some of the antenna elements 111, 112, 113, and 114 included in the array antenna 110 is reflected off of an object. The communication circuit may detect proximity of an object based on a received reflected signal. For example, proximity of an object may be detected according to a strength of a reflected signal. However, the present disclosure is not limited to the above-described embodiment, and the proximity detecting device 120 may include other types of sensors.

The memory 130 may store one or more instructions that may be executed by the processor 140. The processor 140 may execute instructions stored in the memory 130 to control a magnitude or a phase of power supplied to the antenna elements 111, 112, 113, and 114. The electronic device 100 may further include a power supply circuit for controlling power supplied to the antenna elements 111, 112, 113, and 114.

The processor 140 may determine whether a backoff operation event occurs based on a signal generated by the proximity detecting device 120. The electronic device 100 may perform a power backoff operation on the array antenna 110 when the backoff operation event occurs. The power backoff operation may indicate an operation of lowering a gain value of a signal transmitted by the array antenna 110. The backoff operation event may be configured in various ways. The backoff operation event may be defined as an event that occurs when an approaching object is detected by the proximity detecting device 120. For example, the processor 140 may determine that the backoff operation event has occurred when an approaching object is detected by the proximity sensor. In a case where the proximity detecting device 120 includes a distance sensor, when a distance value detected by the sensor is within a set range, it may be determined that the backoff operation event has occurred. In this case, another backoff operation event may occur according to a range within which the distance value falls. For example, the processor 140 may determine that a first backoff operation event has occurred when the distance value is 1 cm or more and less than 10 cm, and determine that a second backoff operation event has occurred when the distance value is less than 1 cm. When the proximity detecting device 120 includes a touch sensor, the backoff operation event may be a case in which a touch input corresponding to an operation of grabbing the electronic device 100 is detected by the touch sensor.

Figure 9:
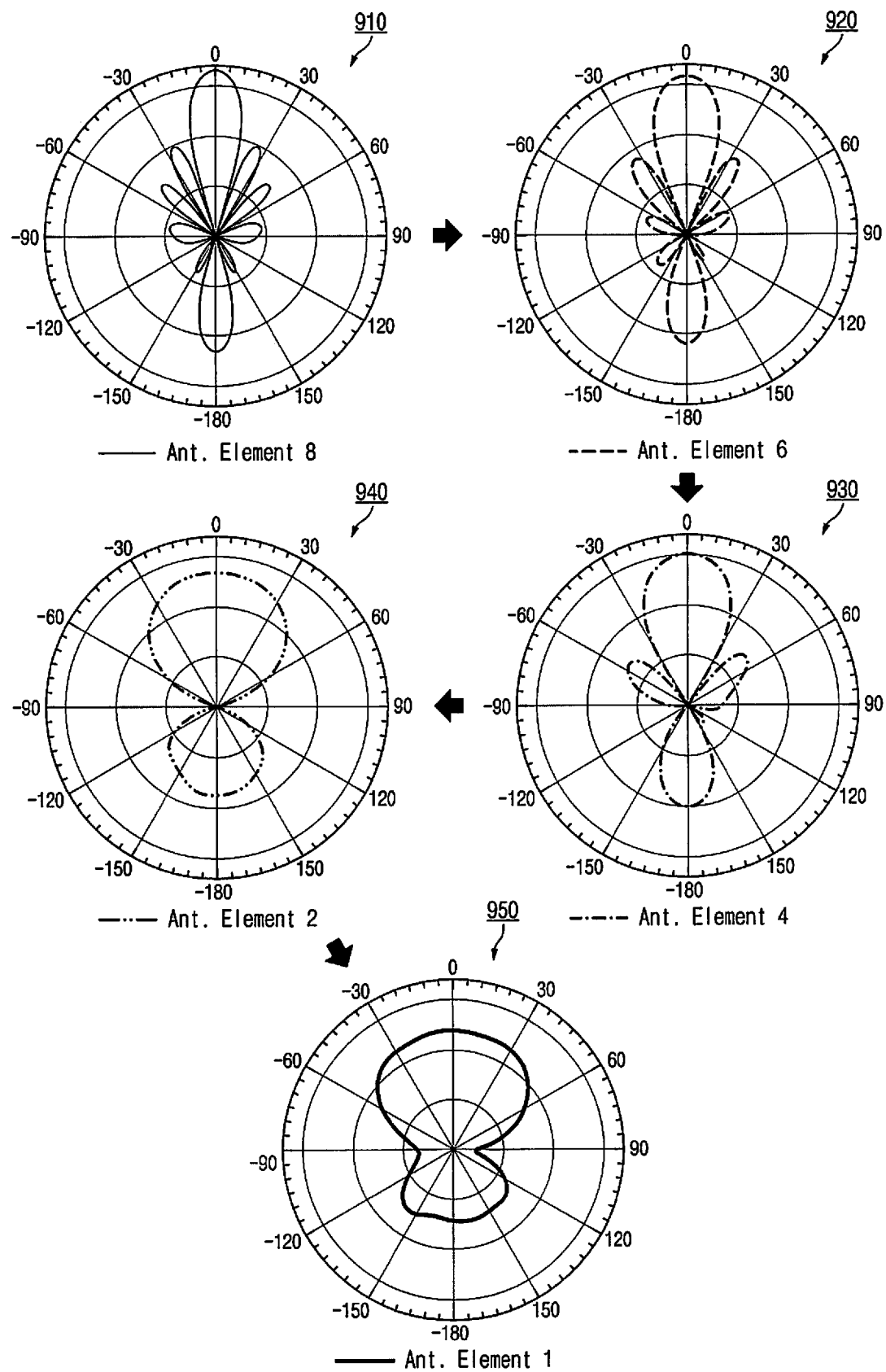
FIG. 9 illustrates graphs of formed beams, according to an embodiment.

When a backoff operation event occurs, the processor 140 may deactivate one or more of the antenna elements 111, 112, 113, and 114 of the array antenna 110. For example, when an approaching object is detected by the proximity detecting device 120, the processor 140 may deactivate at least one of the plurality of antenna elements 111, 112, 113, and 114. In this case, the processor 140 may sequentially deactivate the antenna elements 111, 112, 113, and 114 from the antenna element 111 arranged in an outer portion of the array antenna 110. To be arranged in an outer portion may indicate that, when antenna elements are arranged in a line, an antenna element 111, 112, 113, or 114 is positioned at the end of the line. In addition, to be arranged in an outer portion may indicate that an antenna element 111, 112, 113, or 114 is positioned at the furthest position from the center of a figure including positions at which the antenna elements 111, 112, 113, and 114 are positioned when not arranged in a line. In addition, the processor 140 may sequentially deactivate at least one of the activated antenna elements 111, 112, 113, or 114 among the antenna elements 111, 112, 113, and 114 arranged in the array antenna 110 starting from the outermost antenna element 114. When first deactivating the antenna element 114 arranged in an outer portion, as shown in FIG. 9, the shape of a beam is broad while reducing the energy of the transmitted signal, thus widening coverage.

The memory 130 may further store a backoff table. The backoff table may define a backoff operation to be performed corresponding to a backoff operation event when the backoff operation event occurs. The backoff table may define a number of active antenna elements corresponding to the backoff operation event. The number of active antenna elements may refer to the number of antenna elements that remain in an activated state when a backoff operation event occurs. For example, when the number of active antenna elements is 2 and a backoff operation event occurs while four antenna elements are activated, the processor 140 may sequentially deactivate two antenna elements from the antenna element 111 arranged in an outer portion. Alternatively, the backoff table may further define a transmit power reduction amount. In this case, the transmit power reduction amount may refer to a power reduction amount by which supplied power is reduced by controlling a gain of an amplifier connected to the activated antenna element without deactivating the antenna element. For example, when a required transmit power reduction amount is 1 dB, the processor 140 may apply a power backoff of 1 dB by controlling the gain of the amplifier to be reduced by 1 dB. The backoff table may define a combination of a number of active antenna elements and a transmit power reduction amount. However, a configuration of the backoff table may be an example, and the backoff table may be configured in another form to achieve the same purpose. For example, the number of antenna elements to be deactivated may be defined instead of the number of active antenna elements.

After the at least one antenna element 111, 112, 113, and 114 are deactivated, a beam (or a second beam) may be formed using one or more antenna elements 111, 112, 113, and 114 that remain activated.

The processor 140 may allow the antenna elements 111, 112, 113, and 114 maintaining an activated state to maintain a phase before the antenna element 111 is deactivated and form the second beam.

In addition, after the antenna element 111 is deactivated, the processor 140 may form the second beam while maintaining gain values of power amplifiers connected to the antenna elements maintaining the activated state.

When some of the antenna elements 111, 112, 113, and 114 are deactivated, the transmit power may be backed off because the number of the antenna elements 111, 112, 113, and 114 in the activated state decreases. In addition, when the antenna elements 111, 112, 113, and 114 arranged in an outer portion are sequentially deactivated, a shape of a beam has a broad shape, thus widening coverage. In addition, the effect of reducing the current consumption may be obtained.

The memory 130 may further store a beam book having different beam indexes for beams formed according to active antenna numbers. For example, a first beam and a second beam may be managed using different beam indexes.

The processor 140 may determine a number of active antenna elements 111, 12, 113, and 114 corresponding to the total gain reduction amount for the output of the array antenna 110 to be achieved as a backoff operation event occurs.

Figure 2:
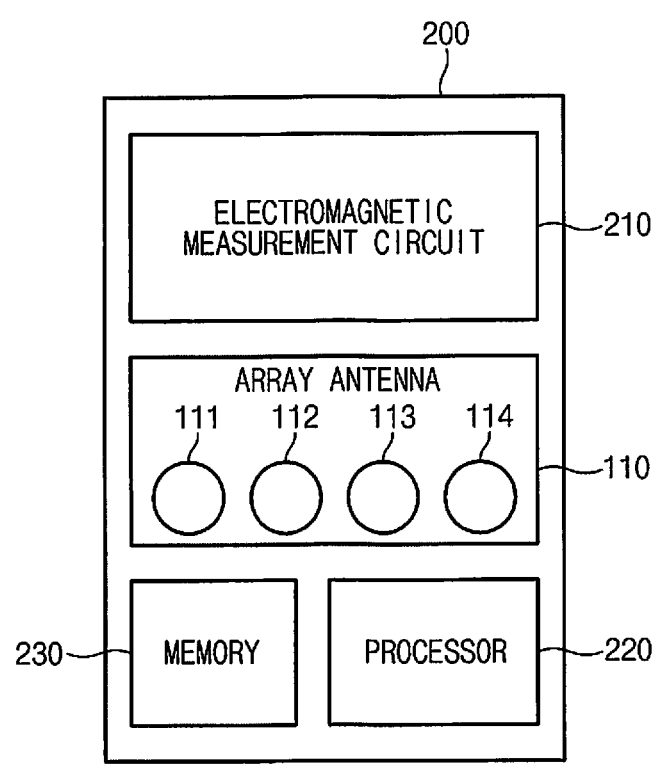
FIG. 2 is a block diagram of a chamber, according to an embodiment.

FIG. 2 is a block a diagram of a chamber 200 according to an embodiment. The chamber 200 may include the array antenna 110, an electromagnetic measurement circuit 210, a processor 220, and a memory 230.

Referring to FIG. 2, electromagnetic waves output from the array antenna 110 may be measured through the electromagnetic measurement circuit 210 while the array antenna 110 is operating in a chamber to set a backoff table. For example, the electromagnetic measurement circuit 210 may be provided in a measurement device configured to determine whether an operating state of the array antenna 110 satisfies the PD limits (e.g., MPE) standard or the SAR standard. In addition, for example, the electromagnetic measurement circuit 210 may include a circuit for measuring PD while the array antenna 110 is operating.

The memory 230 may store one or more instructions that may be executed by the processor 220. The processor 220 may control the operation of the array antenna 110 by executing instructions stored in the memory 230.

The processor 220 may execute the instructions to control the array antenna 110 according to a value measured by the electromagnetic measurement circuit 210 in a state where the array antenna 110 operates. The processor 220 may control the array antenna 110 such that a gain for the output of the array antenna 110 is reduced when a value measured by the electromagnetic measurement circuit 210 does not meet a predetermined condition (e.g., a condition of being less than or equal to the maximum permissible value for the MPE specification, the SAR specification, or PD). The gain for the output of the array antenna 110 may be, for example, a gain value obtained by adding an antenna element gain, an array gain, a chain gain, and a transmit power (Tx Power).

The processor 220 may perform an operation of determining whether a value measured by the electromagnetic measurement circuit 210 satisfies a predetermined condition while deactivating the antenna elements 111, 112, 113, and 114 included in the array antenna 110 from the outermost antenna element in turn, to maintain the beam direction as much as possible while decreasing the gain for the output of the array antenna 110. In addition, the processor 220 may selectively perform an operation of deactivating the antenna elements 111, 112, 113, and 114 and reducing a power supplied to the antenna elements 111, 112, 113, and 114 to reduce the gain for the output of the array antenna 110. When it is attempted to reduce the gain for the output of the array antenna 110 by reducing the power supplied to the antenna elements 111, 112, 113, and 114, the processor 220 may control the gain value of the power amplifier connected to the antenna elements 111, 112, 113, and 114 to reduce the power supplied to the antenna elements 111, 112, 113, and 114.

When the value measured by the electromagnetic measurement circuit 210 satisfies the predetermined condition, the processor 220 may store the backoff table in the memory 230 based on the operating state of the array antenna 110 at the point in time when the measured value satisfies the predetermined condition. The backoff table stored in the memory 230 may be set in the electronic device 100.

In this case, the chamber 200 may be configured such that the electromagnetic measurement circuit 210 corresponds to a backoff operation event to be set in the backoff table. For example, when a backoff operation event is defined as a case where a user's body is adjacent to the electronic device 100, the electromagnetic measurement circuit 210 may be disposed adjacent to the array antenna 110. The backoff table may define a backoff operation of the array antenna 110 matched with the backoff operation event. For example, the backoff table may define a number of active antenna elements, which is the number of antenna elements to be activated among antenna elements 111, 112, 113, and 114 of the array antenna 110 when a backoff operation event occurs. That is, in a state where four antenna elements 111, 112, 113, and 114 are activated, when a backoff operation event matching the backoff operation, in which the number of active antenna elements is defined as 2, occurs, the electronic device 100 may sequentially deactivate two antenna elements positioned in an outer portion.

In addition, the backoff table may further define a transmit power reduction amount for a backoff operation. For example, the backoff table may define the number of active antenna elements as 3 and the power backoff magnitude as 2 dB for a backoff operation.

The backoff table may be set by measuring electromagnetic waves while deactivating the antenna elements positioned in an outer portion one by one. To set the backoff table, the electromagnetic waves according to the operating state of the array antenna 110 may be measured using the electromagnetic measurement circuit 210. When the electromagnetic waves are first measured in the chamber 200, the electromagnetic waves may be measured in a state where all antenna elements 111, 112, 113, and 114 of the array antenna 110 are activated.

Then, whether the measured measurement value exceeds the maximum permissible value may be determined. In this case, the maximum permissible value may be set according to a standard (e.g., the MPE standard, the SAR standard, or the PD standard) that the electronic device 100 must satisfy.

When the measurement value exceeds the maximum permissible value, the outermost antenna element among the activated antenna elements may be deactivated. Thereafter, the electromagnetic waves may be measured again in a state where some antenna elements 111, 112, 113, and 114 are deactivated.

When the measured measurement value is less than or equal to the maximum permissible value, the backoff table may be set according to the operating state of the array antenna 110.

Figure 3:
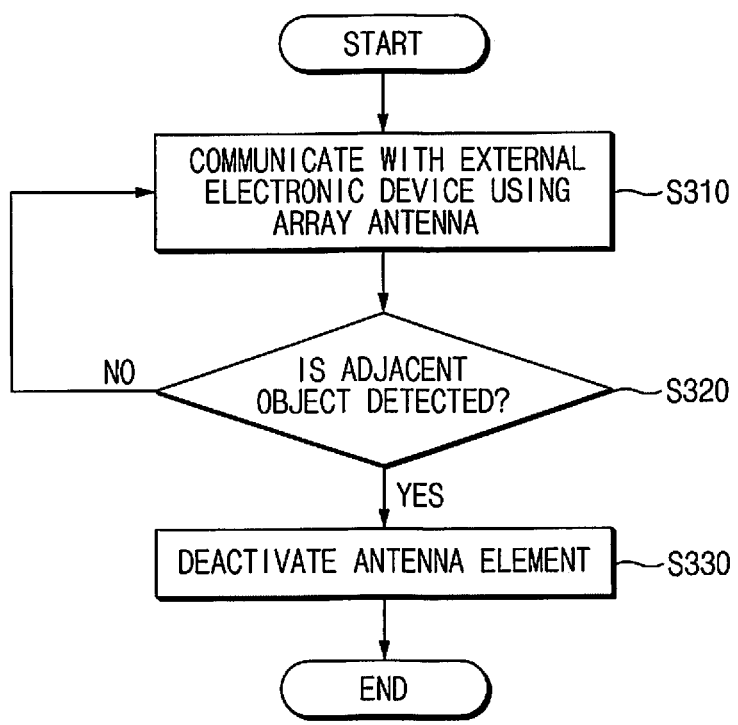
FIG. 3 is a flowchart of a process in which an electronic device performs power backoff on an array antenna including a plurality of antenna elements.

FIG. 3 is a flowchart of a process in which the electronic device 100 performs power backoff on the array antenna 110 including a plurality of antenna elements 111, 112, 113, and 114, according to an embodiment.

Referring to FIG. 3, in step S310, the electronic device 100 may communicate with an external electronic device by using activated antenna elements 111, 112, 113, and 114 in the array antenna 110. In this case, communication may be performed using a beam formed by signals transmitted by the activated antenna elements 111, 112, 113, and 114.

In a state where the electronic device 100 is communicating using the array antenna 110, the electronic device 100 may perform step S320 of detecting an object close to (e.g., adjacent to) the electronic device 100. In this case, a method of detecting an approaching object in the electronic device 100 may be implemented in various ways. When an approaching object is not detected in step S320, the electronic device 100 may continuously perform step S310 for communicating with an external electronic device using the activated antenna elements 111, 112, 113, and 114.

When an approaching object is detected in step S320, the electronic device 100 may perform a power backoff operation to reduce a total gain for the output of the array antenna 110. The power backoff operation may include an operation of deactivating at least one antenna element 111, 112, 113, or 114 included in the array antenna 110. In this case, the electronic device 100 may deactivate the antenna elements 111, 112, 113, and 114 from the antenna elements positioned in an outer portion to maintain a beam formed by the array antenna 110 while decreasing the total gain of the output of the array antenna 110.

FIG. 4 is a table 400 of a gain change amount of the array antenna 110 with respect to a number of active antenna elements 111, 112, 113, and 114, according to an embodiment.

Referring to FIG. 4, when the number of active antenna elements is 4, the gain of the array antenna 110 is 12.04 dB, and when the number of the activated antenna elements is 3, the gain of the array antenna 110 is 9.54 dB. Therefore, when one antenna element 111 is deactivated in a state where four antenna elements 111, 112, 113, and 114 are activated, a power backoff effect of about 2.5 dB may be obtained.

In addition, when the number of active antenna elements is 2, the gain of the array antenna 110 may be 6.02 dB. Therefore, when the two antenna elements positioned in an outer portion are sequentially deactivated in a state where the four antenna elements 111, 112, 113, and 114 are activated, a power backoff effect of about 6.02 dB may be obtained.

However, as shown in FIG. 4, when power backoff is performed only by deactivating the antenna element 111, it is difficult to obtain the magnitude of the power backoff effect at regular intervals. In addition, there is a case where the power backoff operation may be performed in a unit smaller than that of the power backoff effect obtained by performing the power backoff only by deactivating the antenna element 111.

Therefore, the backoff effect may be obtained by using a backoff operation in which a number of active antenna elements 111, 112, 113, and 114 and a transmit power reduction are combined.

First, the electromagnetic measurement circuit 210 may measure the electromagnetic waves according to the operating state of the array antenna 110. When the electromagnetic waves are first measured in the chamber 200, all the antenna elements 111, 112, 113, and 114 of the array antenna 110 may be activated, and the electromagnetic waves may be measured in a state where normal power is supplied to each antenna element 111, 112, 113, and 114.

Then, whether the measured measurement value exceeds the maximum permissible value may be determined. In this case, the maximum permissible value may be set according to a standard that the electronic device 100 must satisfy.

When the measurement value exceeds the maximum permissible value, whether a gain change amount required is greater than the unit change amount may be determined. In this case, the gain change amount may indicate a change amount in the gain of the array antenna 110 when the operating state of the array antenna 110 at the time of measuring the electromagnetic waves is changed to a state in which the antenna element 111 is deactivated.

For example, referring to a table 600 of FIG. 6, in a case where the required change amount is 1 dB, when one antenna element is deactivated in a state where the number of active antenna elements is 4, it may be determined that the gain change amount is greater than a required change amount because the gain change amount is 2.5 dB.

Thereafter, when the gain change amount generated by adjusting the number of antenna elements is greater than the required change amount, a power backoff operation according to the required change amount may be performed. In this case, the power backoff operation may include an operation of reducing the transmit power supplied to each antenna element so as to reduce the total gain by the required amount by controlling the power amplifiers respectively connected to the activated antenna elements.

For example, referring to the table 600 of FIG. 6, when the required change amount is 1 dB, power backoff may be performed in units of 1 dB. When power backoff is applied, it is possible to control a gain reduction amount in a smaller unit basis. For example, it is possible to control a gain reduction amount in the units of 1 dB.

Thereafter, electromagnetic waves according to an operating state of the array antenna 110 on which power backoff is performed may be measured. Thereafter, it may be possible to determine whether a measurement value exceeds the maximum permissible value.

When the measurement value exceeds the maximum permissible value, a determination may be made as to whether the gain change amount is greater than the required change amount. For example, referring to the table 600 of FIG. 6, in a state where four antenna elements are activated and the power backoff of 1 dB is applied, when the power backoff is stopped and three antenna elements are changed to an activated state, a gain change amount of 1.5 dB as compared to a state where the total gain is 11 dB (2.5 dB as compared to a state in which power backoff is not applied) occurs, and therefore, it may be determined that the gain change amount is not greater than the required change amount.

When the gain change amount is less than or equal to the required change amount, the antenna element 111 included in the array antenna 110 may be deactivated. When an operation is being performed in a state where the reduction in the transmit power supplied to the antenna elements 111, 112, 113, and 114 of the array antenna 110 has been applied before deactivation of the antenna element 111, the transmit power that has been reduced and applied may be restored.

Similarly, the operation of deactivating the antenna element or reducing the transmit power may be repeatedly performed until the measurement value is below the maximum permissible value. For example, referring to the table 600 of FIG. 6, after the power backoff operation is repeated twice in the state where three antenna elements are activated, the operation of deactivating the antenna element may be performed.

When the measurement value is less than or equal to the maximum permissible value, the backoff table may be set according to the operating state of the array antenna 110. When a backoff operation event occurs, the electronic device 100 may perform a backoff operation according to the backoff operation event by referring to the backoff table. For example, when a backoff operation event occurs, the electronic device 100 may determine a total gain reduction amount for an output signal of the array antenna 110 to be reduced according to the backoff operation event. Referring to the table 600 of FIG. 6, the electronic device 100 may determine the total gain reduction amount to be achieved by the backoff operation according to the backoff event. For example, when the total gain reduction amount is 4.5 dB, the electronic device 100 may perform a backoff operation of deactivating one antenna element included in the array antenna 110 composed of four antenna elements 111, 112, 113, and 114 and reducing the transmit power supplied to the antenna element by 2 dB.

Figure 5:
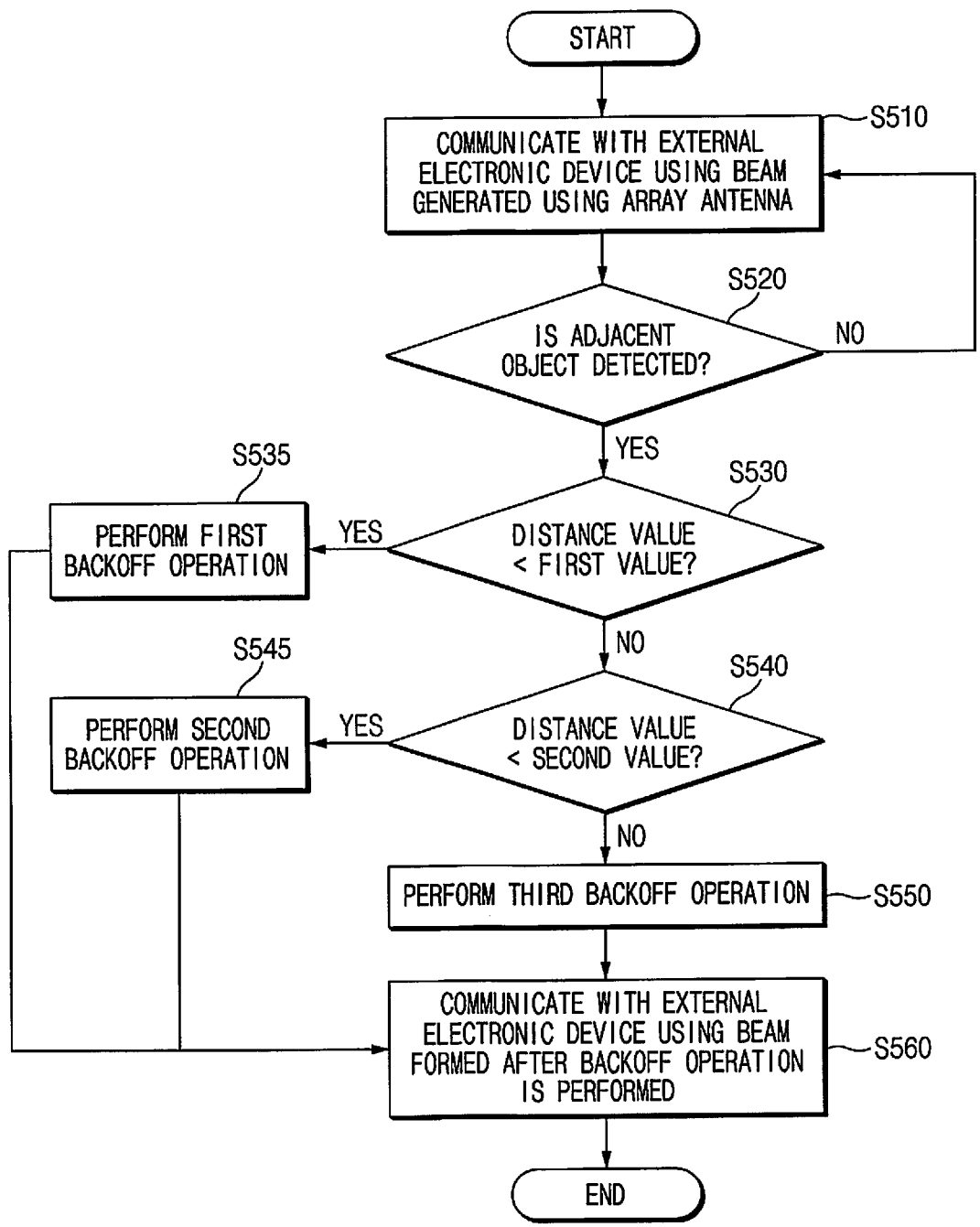
FIG. 5 is a flowchart of a process in which an electronic device performs a backoff operation based on a distance value from an object, according to an embodiment.

FIG. 5 is a flowchart of a process in which the electronic device 100 performs a backoff operation based on a distance value from an object, according to an embodiment.

Referring to FIG. 5, the electronic device 100 may perform step S510 of communicating with an external electronic device through a first beam generated using the array antenna 110. In step S510, the electronic device 100 may perform beamforming to form a first beam by activating antenna elements included in the array antenna 110.

Thereafter, the electronic device 100 may perform step S520 of detecting an object close (e.g., adjacent) to the electronic device 100. Step S520 may be implemented according to various embodiments. For example, the electronic device 100 may perform step S520 by using a proximity sensor that detects the presence or absence of an approaching object, separately from a sensor that detects a distance value with respect to the object. As another example, the electronic device 100 may determine that an object adjacent to the electronic device 100 exists when the detected distance value is less than or equal to a threshold value by using a sensor capable of detecting the distance value from the object.

Thereafter, the electronic device 100 may determine a backoff operation to be performed. The electronic device 100 may determine a total gain reduction amount for the output of the array antenna 110 according to a distance value between the electronic device 100 and an object adjacent to the electronic device 100. When the gain reduction amount is determined, the electronic device 100 may perform a backoff operation corresponding to the gain reduction amount.

A backoff operation based on a distance value may be configured as in steps S530, S535, S540, S545, and S550. The electronic device 100 may perform step S530 of determining whether a distance value between the electronic device 100 and the approaching object is less than a first value. When the distance value is less than the first value, the electronic device 100 may perform a first backoff operation in step S535. When the distance value is not less than the first value, the electronic device 100 may perform step S540 of determining whether the distance value is less than a second value. In this case, the first value and the second value may be different values. For example, the second value may be greater than the first value. When the distance value is less than the second value, the electronic device 100 may perform a second backoff operation in step S545. When the distance value is not less than the second value, the electronic device 100 may perform a third backoff operation in step S550.

Steps S530 and S540 may be implemented according to various embodiments. According to an embodiment, step S530 may determine whether the distance value falls within a first range. In addition, step S540 may determine whether the distance value falls within a second range.

The first backoff operation in step S535, the second backoff operation in step S545, and the third backoff operation in step S550 may be operations performed to reduce a total gain value for an output of the array antenna 110 according to the distance value with respect to the approaching object. For example, the first backoff operation in step S535 may be an operation of reducing a transmit power supplied to the activated antenna elements. For example, the second backoff operation in step S545 may be an operation of deactivating at least one of the activated antenna elements. For example, the third backoff operation in step S550 may be an operation of deactivating at least one of the activated antenna elements and reducing the transmit power supplied to the activated antenna elements.

FIGS. 7A, 7B, 7C, and 7D, are block diagrams of the array antenna 110 that illustrate an order of deactivating antenna elements, according to an embodiment. The array antenna 110 shown in FIGS. 7A, 7B, 7C, and 7D illustrate cases in which four antenna elements 111, 112, 113, and 114 are arranged in a 1×4 form.

Figure 7A:
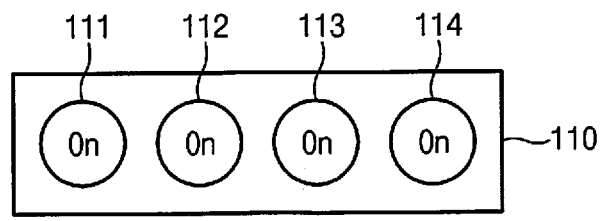
FIGS. 7A, 7B, 7C, and 7D are block diagrams of orders of deactivating antenna elements, according to an embodiment.

Referring to FIGS. 7A, 7B, 7C, and 7D, the plurality of antenna elements 111, 112, 113, and 114 arranged in a line within the array antenna 110 may, initially, all operate in an activated state, as illustrated in FIG. 7A.

For example, FIGS. 7A, 7B, 7C, and 7D illustrate that when a backoff operation event occurs, three antenna elements are deactivated.

Figure 7B:
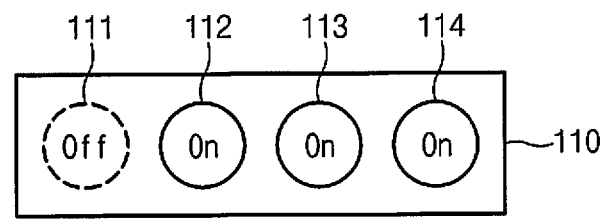

As illustrated in FIG. 7B, the electronic device 100 may deactivate the first antenna element 111 arranged at one end of the array antenna 110 among the antenna elements 111, 112, 113, and 114.

Figure 7C:
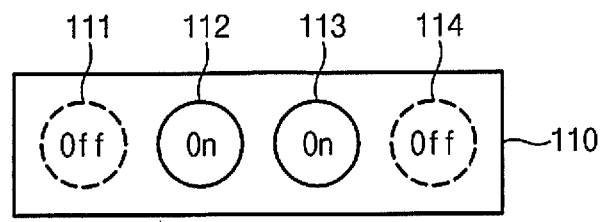
Figure 7D:
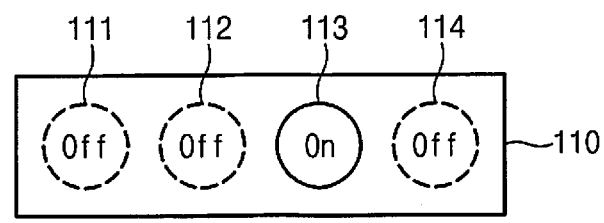

Thereafter, the electronic device 100 may deactivate the second antenna element 114 disposed at an end opposite to the first antenna element 111 in the array antenna 110 as illustrated in FIG. 7C. After the second antenna element 114 is deactivated, the electronic device 100 may deactivate the third antenna element 112, as illustrated in FIG. 7D.

FIGS. 8A, 8B, 8C, 8D, 8E, and 8F are block diagrams of an array antenna 810 that illustrate an order of deactivating antenna elements, according to an embodiment. The array antenna 810 may include six antenna elements 111, 112, 113, 114, 115, and 116 arranged in a 2×3 form. For example, FIGS. 8A, 8B, 8C, 8D, 8E, and 8F illustrate a case where five antenna elements are deactivated.

Figure 8A:
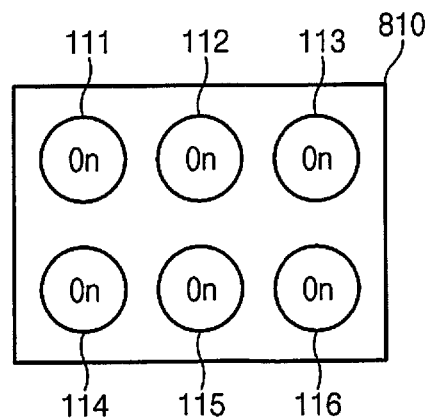
FIGS. 8A, 8B, 8C, 8D, 8E, and 8F are block diagrams of orders of deactivating antenna elements, according to an embodiment.

Referring to FIGS. 8A, 8B, 8C, 8D, 8E, and 8F, the antenna elements 111, 112, 113, 114, 115, and 116 may, initially, all operate in an activated state, as illustrated in FIG. 8A.

Figure 8B:
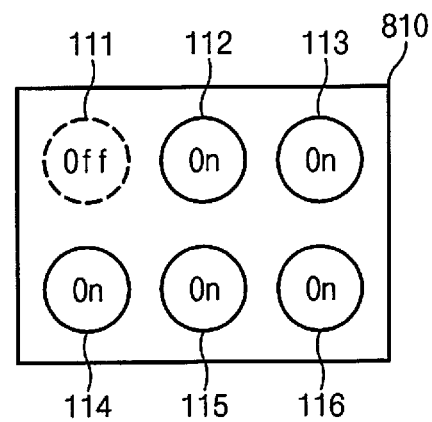

In this case, when a backoff operation event occurs, as shown in FIG. 8B, the electronic device 100 may first deactivate the antenna element 111 positioned at the first column of a first row. Subsequently, as shown in FIG. 8C, the electronic device 100 may deactivate the antenna element 114 positioned in the second row of the first column to deactivate the antenna elements 111 and 114 in the first column.

Figure 8C:
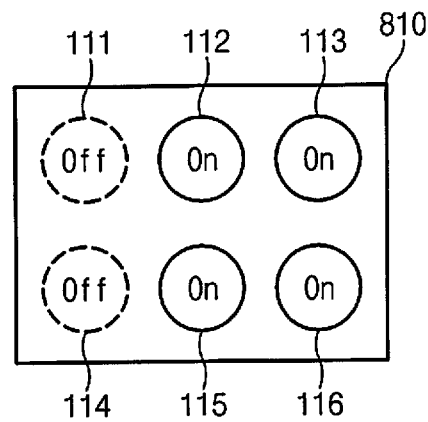
Figure 8D:
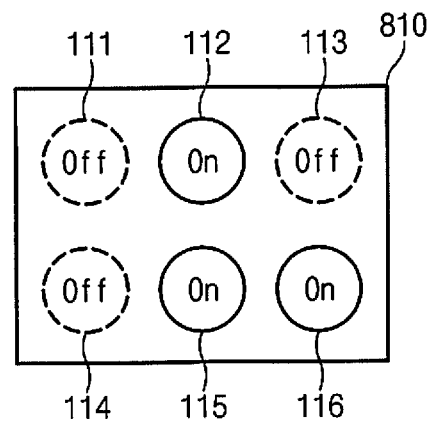
Figure 8E:
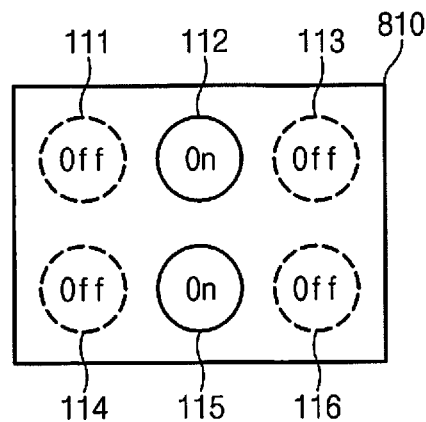
Figure 8F:
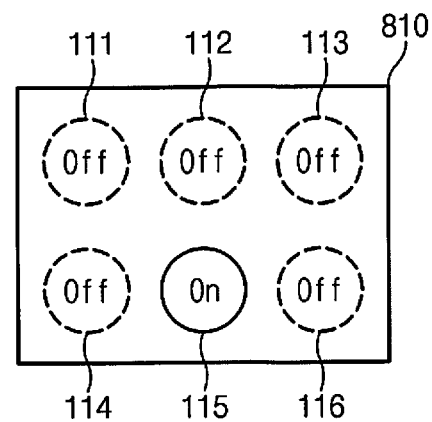

Thereafter, the antenna elements 112, 113, 115, and 116 in an activated state as shown in FIG. 8C are arranged in a square shape. Therefore, the electronic device 100 may subsequently deactivate antenna elements in one row or sequentially deactivate antenna elements in one column. When the antenna elements in the other columns are first deactivated in the state shown in FIG. 8C, active antenna elements may be sequentially deactivated in an order of 113, 116, and 112, as shown in FIGS. 8D, 8E, and 8F, respectively.

For example, a plurality of antenna elements may be arranged in M rows and N columns in the array antenna 810 by further extending the concept illustrated in FIGS. 8A, 8B, 8C, 8D, 8E, and 8F. In this case, the electronic device 100 may first deactivate antenna elements in a row or a column of the greater number among rows and columns. That is, when N is greater than M, the electronic device 100 may sequentially deactivate antenna elements in the first column. Accordingly, when M is greater than N, the electronic device 100 may sequentially deactivate antenna elements in the first row. The order of deactivating the antenna elements may be determined based on the arrangement of the activated antenna elements.

FIG. 9 illustrates graphs of formed beams, according to an embodiment.

Referring to FIG. 9, graph 910 shows a shape of a beam formed when eight antenna elements are activated. The shape of the beam has a narrow shape. In contrast, the shape of the beam shown in the graph 920 shows a shape of a beam formed in a state where six antenna elements are activated and the shape of the beam shown in the graph 930 shows a shape of a beam formed in a state where four antenna elements are activated, where the shapes in graphs 920 and 930 gradually become broader as compared to graph 910. This pattern of beam broadening continues in graphs 940 and 950.

Therefore, in a case of sequentially deactivating antenna elements positioned in an outer portion in a state in which a beam is forming, the shape of the beam formed while maintaining a direction of a beam to some extent may become broader, thus increasing coverage.

Figure 10:
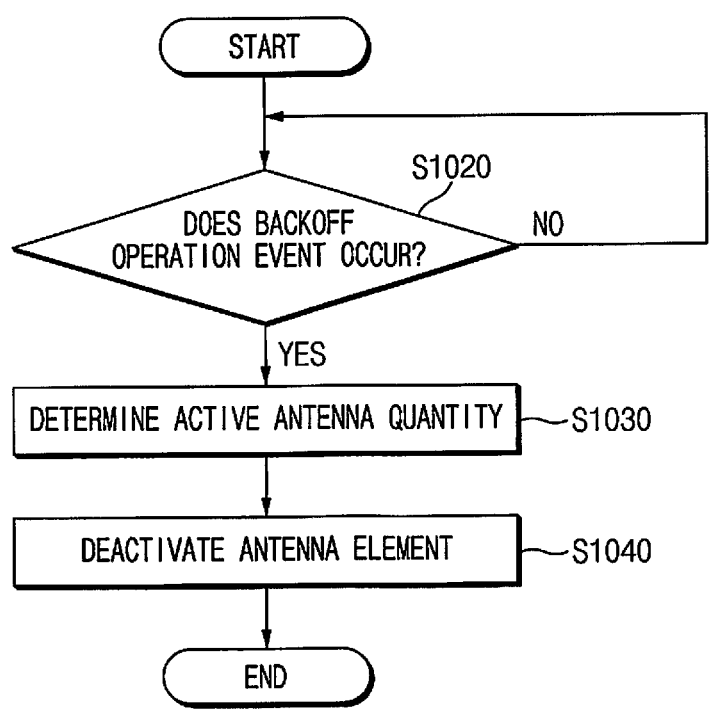
FIG. 10 is a flowchart of a process of performing power backoff in an electronic device, according to an embodiment.

FIG. 10 is a flowchart of a process of performing power backoff in an electronic device, according to an embodiment.

Referring to FIG. 10, in step S1020, the electronic device 100 may determine (e.g., detect) whether a backoff operation event occurs. For example, the electronic device 100 may detect that a human body is adjacent to or touches the electronic device 100 by using a sensor.

When it is determined in step S1020 that the backoff operation event has not occurred, the method returns to step S1020. When it is determined in step S1020 that the backoff operation event has occurred, the electronic device 100 may determine a backoff operation to be performed corresponding to the backoff operation event in step S1030. The electronic device 100 may determine the backoff operation based on a backoff table set in the electronic device 100.

For example, the electronic device 100 may determine a number of active antenna elements corresponding to the backoff operation event that has occurred. When the active antenna number is determined, the number of antenna elements to be deactivated may be determined based on the number of activated antenna elements. As another example, the electronic device 100 may determine a combination of the number of active antenna elements and a transmit power reduction amount, which corresponds to the backoff operation event that has occurred.

Thereafter, in step S1040, the electronic device 100 may perform the determined backoff operation. For example, the electronic device 100 may deactivate one or more antenna elements according to the determined number of active antenna elements. Alternatively, power backoff may be performed by deactivating one or more antenna elements according to the number of active antenna elements and controlling gain values of power amplifiers connected to the antenna elements maintaining an activated state.

In step S1040, the electronic device 100 may control the array antenna 110 to form a beam while maintaining a phase applied to the antenna elements that are not deactivated.

In addition, when the backoff operation does not include an operation of performing power backoff on each antenna element, the electronic device 100 may maintain the gain values of the amplifiers connected to the antenna elements that are not deactivated.

Figure 11:
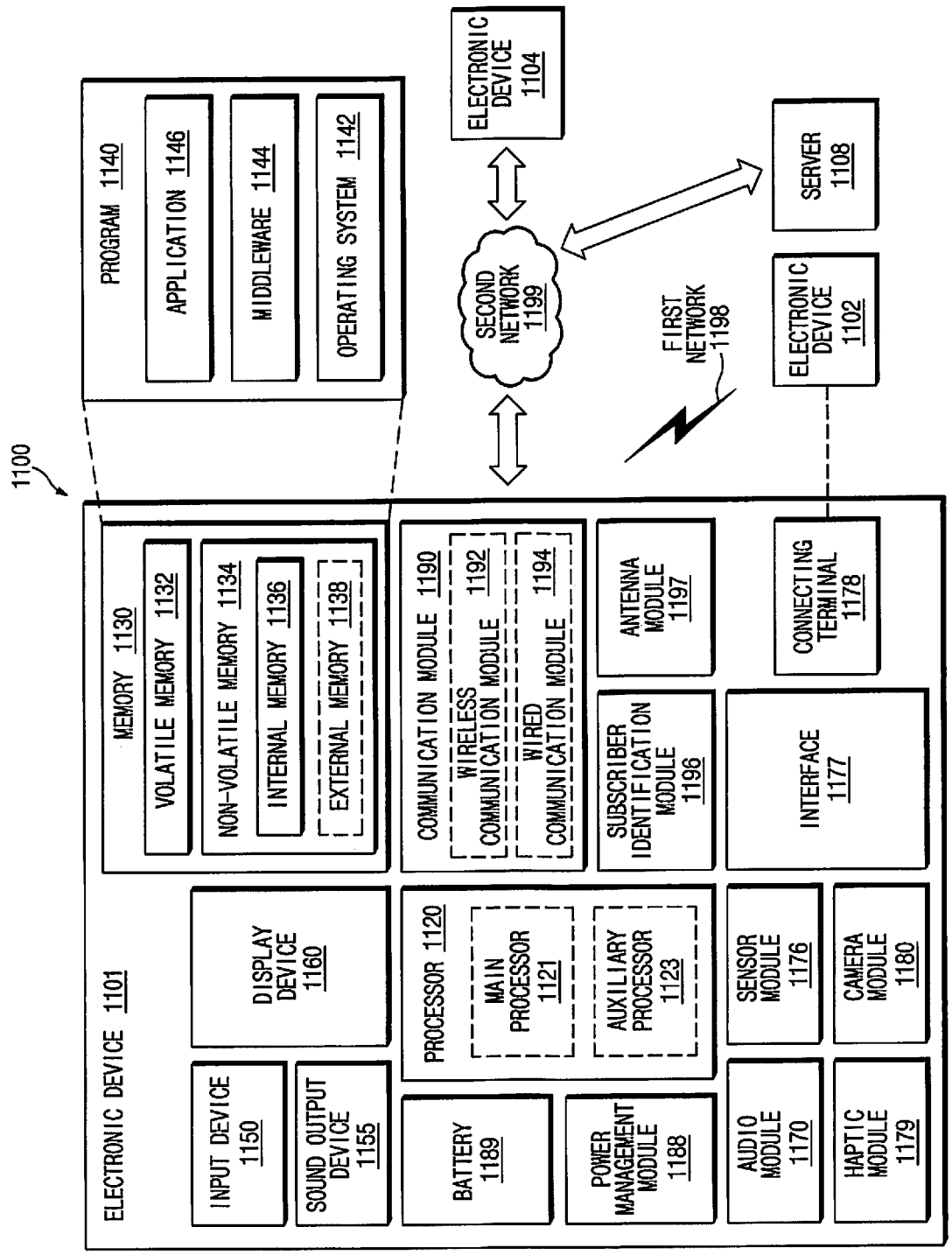
FIG. 11 is a block diagram of an electronic device in a network environment, according to an embodiment.

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an ISP or a CP) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, ISPs, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more CPs that are operable independently from the processor 1120 (e.g., the AP) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIN)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101.

According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101).

For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments disclosed herein, it is possible to widen coverage and reduce current consumption while efficiently performing power backoff.

In addition, various effects may be provided that are directly or indirectly understood through the present disclosure.

While the present disclosure has been shown and described with reference to various embodiments thereof, it will be understood by those skilled in the art that various changes in form and details may be made therein without departing from the scope of the present disclosure as defined by the appended claims and their equivalents.

What is claimed is:

1. An electronic device, comprising:
   an array antenna comprising a plurality of antenna elements arranged to perform beamforming;
   a proximity detecting device configured to detect a proximity of an object;
   a memory; and
   a processor,
   wherein the memory is configured to store instructions that, when executed, cause the processor to:
   communicate with an external electronic device through a first beam formed using the plurality of antenna elements; and
   deactivate at least one of the plurality of antenna elements while maintaining the communication with the external electronic device through the first beam using a remainder of the plurality of antenna elements that is not deactivated, when the proximity of the object is detected by the proximity detecting device during communication with the external electronic device, wherein the processor, when the instructions are executed, is configured to sequentially deactivate antenna elements arranged in an outer portion among the plurality of antenna elements.

2. The electronic device of claim 1, wherein the proximity detecting device comprises a proximity sensor.

3. The electronic device of claim 1, wherein the proximity detecting device comprises a communication circuit,
   wherein the communication circuit is configured to transmit a signal through at least some of the plurality of antenna elements, and
   detect the proximity of the object using a reflected signal of the transmitted signal, wherein the reflected signal is received through at least some of the plurality of antenna elements.

4. The electronic device of claim 3, wherein the communication circuit further comprises a radio frequency integrated circuit (RFIC) and an antenna module, and
   wherein the array antenna is included in the antenna module.

5. The electronic device of claim 1, wherein the memory is further configured to store a backoff table that defines a combination of a number of active antenna elements among the plurality of antenna elements and a transmit power reduction amount, and
   store instructions that, when executed, cause the processor to:
   obtain the number of active antenna elements and the transmit power reduction amount from the backoff table when the proximity of the object is detected,
   control whether the plurality of antenna elements is activated according to the number of active antenna elements, and
   control power supplied to the activated antenna elements according to the transmit power reduction amount.

6. The electronic device of claim 5, wherein the memory is further configured to store a beam book having different beam indexes according to the number of active antenna elements.

7. The electronic device of claim 1, wherein the proximity detecting device comprises a distance sensor configured to generate an electrical signal corresponding to a distance between the proximity detecting device and the object,
   wherein the instructions comprise instructions for determining a number of active antenna elements among the plurality of antenna elements based on a distance value corresponding to the electrical signal, and
   determining the deactivated antenna elements among the plurality of antenna elements based on the determined number of active antenna elements.

8. The electronic device of claim 1, wherein the memory is further configured to store instructions for communicating with the external electronic device through a second beam formed by maintaining a phase applied to antenna elements among the plurality of antenna elements which are not deactivated to generate the first beam when the proximity of the object is detected.

9. The electronic device of claim 1, wherein the plurality of antenna elements are arranged in a line in the array antenna,
- wherein the instructions comprise instructions for deactivating a first antenna element arranged at one end in the array antenna, and
- deactivating a second antenna element arranged at the other end of the first antenna element after the first antenna element is deactivated.

10. The electronic device of claim 1, wherein the plurality of antenna elements are arranged in M rows×N columns in the array antenna,
- wherein the instructions comprise:
- instructions for sequentially deactivating antenna elements in a first column from an antenna element in the first column of a first row when N is greater than M, and
- instructions for sequentially deactivating antenna elements in the first row from an antenna element in the first column of the first row when M is greater than N,
- wherein M and N are integers greater than or equal to 2.

11. A method of performing power backoff for an array antenna comprising a plurality of antenna elements, the method comprising:
- forming a first beam using the plurality of antenna elements;
- communicating with an external electronic device through the first beam;
- detecting proximity of an object while communicating with the external electronic device;
- determining a number of active antenna elements among the plurality of antenna elements when the proximity of the object is detected; and
- deactivating at least one antenna element among the plurality of antenna elements while maintaining the communicating with the external electronic device through the first beam using a remainder of the plurality of antenna elements that is not deactivated, based on the determined number of active antenna elements, wherein the processor, when the instructions are executed, is configured to sequentially deactivate antenna elements arranged in an outer portion among the plurality of antenna elements.

12. The method of claim 11, wherein determining the number of active antenna elements comprises: searching for, from a backoff table, a combination of a number of active antenna elements among the plurality of antenna elements and a transmit power reduction amount corresponding to a total gain reduction amount required according to the proximity of the object when the proximity of the object is detected; further comprising: controlling power supplied to the activated antenna elements among the plurality of antenna elements according to a magnitude of the transmit power reduction amount.

13. The method of claim 12, wherein detecting the proximity of the object comprises:
- determining a distance from the object, and
- determining the total gain reduction amount according to the distance,
- wherein determining the number of active antenna elements comprises determining the total gain reduction amount according to the determined distance.

14. The method of claim 11, further comprising:
- communicating with the external electronic device through a second beam formed using one or more remaining antenna elements other than the at least one deactivated antenna element among the plurality of antenna elements.

15. The method of claim 14, wherein forming the second beam comprises forming the second beam by maintaining a phase applied to antenna elements that are not deactivated among the plurality of antenna elements.

16. The method of claim 14, wherein forming the second beam comprises forming the second beam by maintaining amplification values of amplifiers connected to the antenna elements which are not deactivated after the antenna element is deactivated among the plurality of antenna elements.

17. The method of claim 11, wherein the plurality of antenna elements are arranged in a line in the array antenna,
- wherein deactivating the at least one antenna element comprises:
- deactivating a first antenna element arranged at one end in the array antenna, and
- deactivating a second antenna element arranged at the other end of the first antenna element after the first antenna element is deactivated.

18. The method of claim 11, wherein the plurality of antenna elements are arranged in M rows×N columns in the array antenna,
- wherein deactivating the at least one antenna element comprises
- sequentially deactivating antenna elements in a first column from an antenna element in the first column of a first row when N is greater than M,
- sequentially deactivating antenna elements in the first row from an antenna element in the first column of the first row when M is greater than N, and
- wherein M and N are integers greater than or equal to 2.

19. The method of claim 11, wherein detecting the proximity of the object comprises:
- receiving a reflected signal generated when a signal transmitted through at least some of the plurality of antenna elements is reflected off the object; and
- determining the proximity of the object using the reflected signal.

* * * * *